(12) United States Patent
Takano et al.

(10) Patent No.: US 7,589,923 B2
(45) Date of Patent: Sep. 15, 2009

(54) PRISM, IMAGING DEVICE AND LIGHTING DEVICE INCLUDING THE SAME, AND PRISM MANUFACTURING METHOD

(75) Inventors: Toshiaki Takano, Osaka (JP); Minoru Onoda, Osaka (JP); Tomokazu Tokunaga, Hyogo (JP)

(73) Assignee: Panasonic Corporation, Osaka (JP)

( * ) Notice: Subject to any disclaimer, the term of this patent is extended or adjusted under 35 U.S.C. 154(b) by 115 days.

(21) Appl. No.: 11/792,485

(22) PCT Filed: Nov. 8, 2006

(86) PCT No.: PCT/JP2006/022259

§ 371 (c)(1),
(2), (4) Date: Jun. 7, 2007

(87) PCT Pub. No.: WO2007/060835

PCT Pub. Date: May 31, 2007

(65) Prior Publication Data
US 2008/0130147 A1 Jun. 5, 2008

(30) Foreign Application Priority Data
Nov. 24, 2005 (JP) ............................. 2005-338477

(51) Int. Cl.
*G02B 5/04* (2006.01)
(52) U.S. Cl. ..................................... 359/833
(58) Field of Classification Search ................. 359/833, 359/834, 831
See application file for complete search history.

(56) References Cited

U.S. PATENT DOCUMENTS

| 5,917,655 A * | 6/1999 | Lehnen et al. ............... 359/834 |
| 6,690,496 B2 * | 2/2004 | Hama et al. .................. 359/204 |
| 6,844,279 B2 * | 1/2005 | Hayashi et al. ................. 65/63 |
| 2002/0017600 A1 | 2/2002 | Ikeda |

FOREIGN PATENT DOCUMENTS

| JP | 60-019301 | 5/1985 |
| JP | 61-103101 | 5/1986 |
| JP | 07-069651 | 3/1995 |
| JP | 09-113961 | 5/1997 |
| JP | 11-205664 | 7/1999 |
| JP | 2002-051189 | 2/2002 |
| JP | 2002-350620 | 12/2002 |
| JP | 2003-167205 | 6/2003 |
| JP | 2003-329817 | 11/2003 |
| JP | 2004-004339 | 1/2004 |

* cited by examiner

*Primary Examiner*—Euncha P Cherry
(74) *Attorney, Agent, or Firm*—McDermott Will & Emery LLP (57) ABSTRACT

A prism 30 includes a prism body 31 formed into a polygonal column. At least one ridge 35 of a plurality of ridges 35 of the prism body 31 is formed into a flat face 37. A joint part 38 between the flat face 37 and at least one 32, 33 of the faces 32, 33 of the prism body 31 which are adjacent to each other with the ridge 35 in the flat face 37 interposed is formed into an R-plane.

16 Claims, 4 Drawing Sheets

PRISM, IMAGING DEVICE AND LIGHTING DEVICE INCLUDING THE SAME, AND PRISM MANUFACTURING METHOD

TECHNICAL FIELD

The present invention relates to a prism, an imaging device and a light system each including it, and a prism manufacturing method.

BACKGROUND ART

In recent years, prisms are widely used as essential parts of various kinds of optical equipment, such as DSCs (digital still cameras), DVCs (digital video cameras), cameras for mobile phones, projection televisions, and the like, and the range of uses thereof is expanding. While, demands for higher precision, compaction, and weight reduction of the various optical equipment are increasing. In association therewith, the prisms used in the various optical equipment are required to have higher performance, such as higher precision, higher functionality, higher strength, and the like and are also required to be mounted at appropriate positions of the optical equipment.

A general triangular prism includes three side faces as optical function planes and two end faces as non-optical function planes. As a glass-made prism manufacturing method, a generally-called press molding method is known in which a material to be molded is heated and pressed and then is cooled (see, for example, Patent Document 1).

When a prism is molded by the press molding method disclosed in Patent Document 1, each ridge where the planes are intersected with one another is formed sharply. Accordingly, in handling the prism, specifically, in conveyance, in mounting to optical equipment, and the like, the ridges may be broken or chipped by external impact. For this reason, desired prism performance cannot be obtained, and the yield of the optical equipment lowers.

For tackling the above problems, namely, for suppressing breakage and chipping of the ridges, a prism of which ridges are chamfered after press molding has been proposed (see, for example, Patent Document 2).
Patent Document 1: Japanese Patent Application Laid Open Publication No. 7-69651A
Patent Document 2: Japanese Patent Application Laid Open Publication No. 61-103101A

SUMMARY OF THE INVENTION

Problems that the Invention is to Solve

In Patent Document 2, however, a post treatment is added after prism molding, increasing the number of processing steps and costs. Further, the ridges of the prism before the post treatment are sharp yet, still remaining the problems of breakage and chipping to result in a low performance prism.

The present invention has been made in view of the foregoing and has its object of providing a prism of which breakage and chipping hardly occur and which can be mounted at an accurate position of optical equipment.

Means for Solving the Problems

A prism according to the present invention includes a prism body formed into a polygonal column. At least one of a plurality of ridges of the prism body is formed into a flat face. A joint part between the flat face and at least one of faces of the prism body which are adjacent to each other with the ridge in the flat face interposed is formed into an R-plane.

An imaging device according to the present invention includes: a light receiving element; and a prism. The prism includes a prism body formed into a polygonal column. At least one of a plurality of ridges of the prism body is formed into a flat face. A joint part between the flat face and at least one of faces of the prism body which are adjacent to each other with the ridge in the flat face interposed is formed into an R-plane. The prism body is in a form of a right triangular prism including two orthogonal side faces which are intersected at a right angle with each other and an inclined side face which is inclined with respect to the two orthogonal side faces. The prism body is arranged so that incident light to the prism body is reflected by the inclined side face toward the light receiving element.

A lighting device according to the present invention includes: a light source; and a prism. The prism includes a prism body formed into a polygonal column. At least one of a plurality of ridges of the prism body is formed into a flat face. A joint part between the flat face and at least one of faces of the prism body which are adjacent to each other with the ridge in the flat face interposed is formed into an R-plane. The prism body is in a form of a right triangular prism including two orthogonal side faces which are intersected at a right angle with each other and an inclined side face which is inclined with respect to the two orthogonal side faces. The prism body is arranged so that light from the light source is reflected by the inclined side face.

In a prism manufacturing method according to the present invention, a prism base material is press-molded while being heated to obtain a prism body. The prism body is molded into a form of a right triangular prism including two orthogonal side faces which are intersected at a right angle with each other and an inclined side face which is inclined with respect to the two orthogonal side faces. At least one of a plurality of ridges of the prism body is formed into a flat face. A joint part between the flat face and at least one of faces of the prism body which are adjacent to each other with the ridge in the flat face interposed is formed into an R-plane.

EFFECTS OF THE INVENTION

The present invention can provide a prism of which breakage and chipping hardly occur and which can be mounted at an appropriate position of optical equipment.

EXPLANATION OF THE REFERENCE NUMERALS 1 imaging device
2 lighting device 11 light receiving element
30 prism
31 prism body
32a light incident plane (orthogonal side face)
32b light exit plane (orthogonal side face)
32c light reflection plane (inclined side face)
33a, 33b end face
35a to 35f ridge
37a, 37b flat face
38a, 38b joint part
42 upper die
43 lower die
44 mold body
48 inner space
50 prism base material
51 light source

BEST MODE FOR CARRYING OUT THE INVENTION

Embodiments of the present invention will be described below with reference to the accompanying drawings.

Embodiment 1

Figure 1:
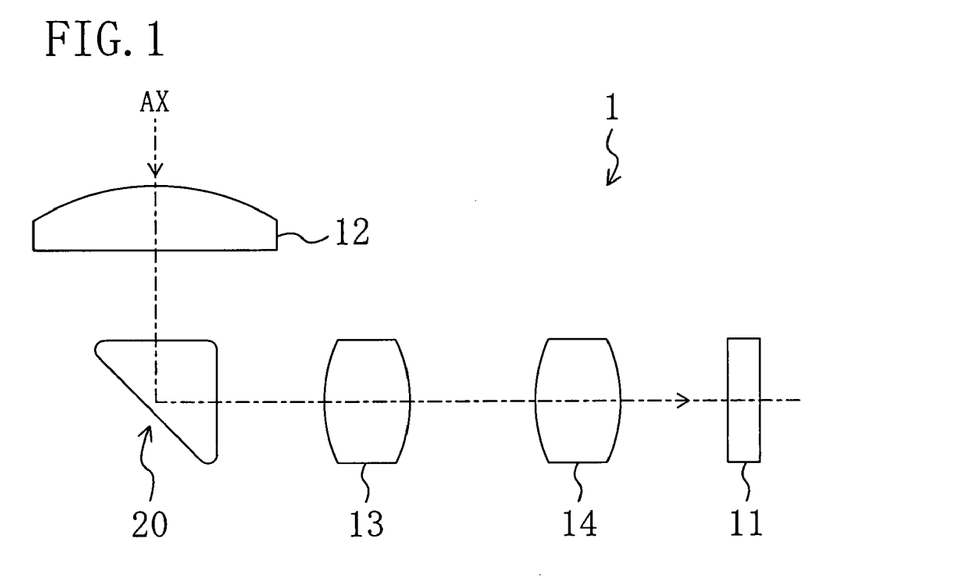
FIG. 1 is a diagram showing a configuration of a main part of an imaging device according to Embodiment 1 of the present invention.

FIG. 1 shows an imaging device 1 according to Embodiment 1 of the present invention. The imaging device 1 includes a light receiving element 11, a plurality of lens groups (specifically, a first lens group 12, a second lens group 13, and a third lens group 14), and an optical element unit 20.

The first lens group 12 is arranged so as to be exposed from the imaging device 1 for receiving external light. The external light made incident from the first lens group 12 is made incident to the optical element unit 20. The incident light is converted by the optical element unit 20 to light different in direction of the optical axis. The converted light is imaged on the light receiving element 11 through the second lens group 13 and the third lens group 14. The imaged image is converted to an electric signal in the light receiving element 11 and is output to be recorded in a recoding section (not shown), such as a memory or the like. The light receiving element 11 may be composed of, for example, a charge coupled device (CCD), a complementary metal oxide semiconductor (CMOS), or the like.

Figure 2:
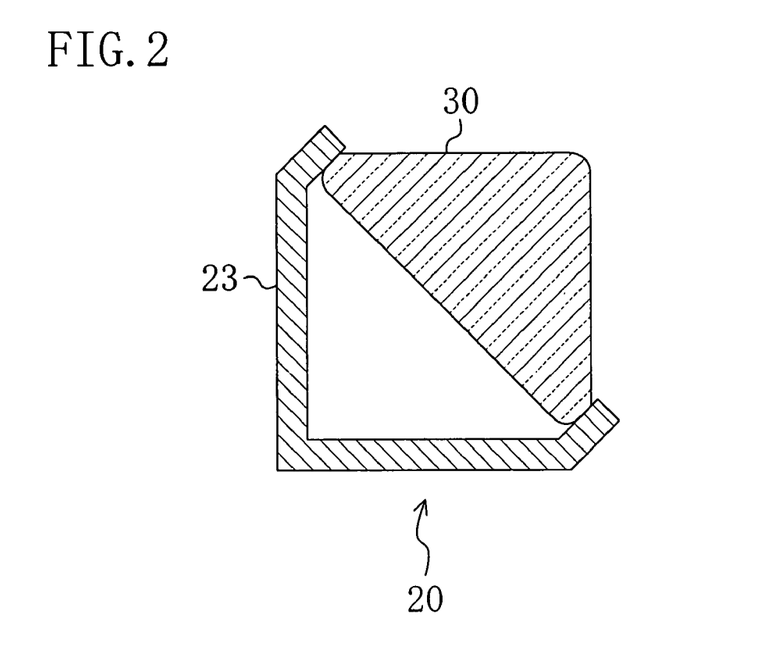
FIG. 2 is a sectional view showing an optical element unit according to Embodiment 1.

The optical element unit 20 includes a prism 30 and an housing member 23 in which the prism 30 is housed.

The prism 30 includes a prism body 31 formed into a polygonal column (including a truncated pyramid). At least one of a plurality of ridges 36 of the prism body 31 is formed into a flat face 37. The thus formed flat face 37 can serve as a base plane in mounting the prism 30 to the housing member 23 to facilitate positioning in mounting, thereby enabling provision of the prism 30 that can be mounted at an accurate position of the imaging device 1. Further, a joint part 38 between the flat face 37 and at least one of faces 32 of the prism body 31 which are adjacent to each other with the ridge 36 in the flat face 37 interposed is formed into an R-plane. The joint part 38 formed into the R-plane is prevented from being broken and chipped.

The prism body 31 in a polygonal column includes a plurality of side faces 32 serving as optical function planes and end faces 33a, 33b serving as non-function planes. Each optical function planes herein is a plane having an optical function that transmits and reflects necessary light for actual use thereof while the non-optical function planes is a plane having no optical function.

In the prism body 31 in the polygonal column, at least one ridge 36 of a plurality of ridges 36 formed between adjacent side faces 32 is formed into a flat face 37. Accordingly, the flat face of the ridge 36 formed between the side faces 32 can be used as a base plane in mounting the prism 30 to the housing member 23, which leads to facilitation of positioning in mounting, thereby enabling provision of the prism 30 that can be mounted at an accurate position of the imaging device 1. Further, a joint part 38 between the flat face 37 and one of the side faces 32 of the polygonal column which are adjacent to each other with the ridge 36 in the flat face 37 interposed is formed into an R-plane. Optionally, a joint part 38 between the flat face 37 and the other one 32 of the side faces 32 of the polygonal column which are adjacent to each other with the ridge 36 in the flat face 37 interposed is formed into an R-plane. Hence, the joint parts 38 formed into the R-planes are prevented from being broken and chipped.

In order to secure high optical performance by suppressing breakage and chipping of the prism 30, preferably, at least one 35 of a plurality of ridges 35 formed between the respective side faces 32 and the respective end faces 33a, 33b of the prism body 31 in the polygonal column is formed into an R-plane. More preferably, all of the plurality of ridges 35 are formed into R-planes.

Figure 3A:
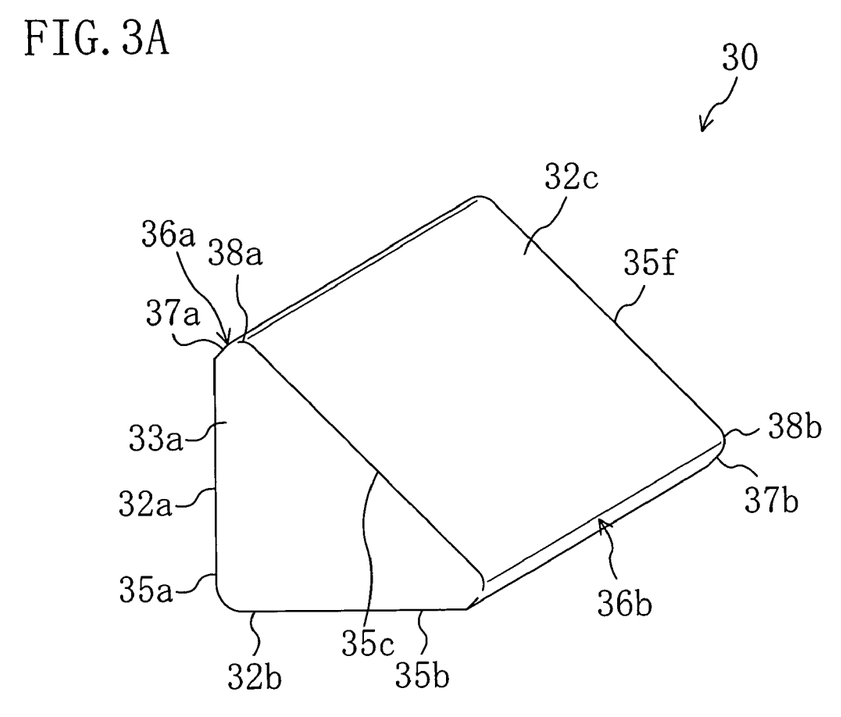
FIG. 3 is a perspective view of a prism according to Embodiment 1.
Figure 3B:
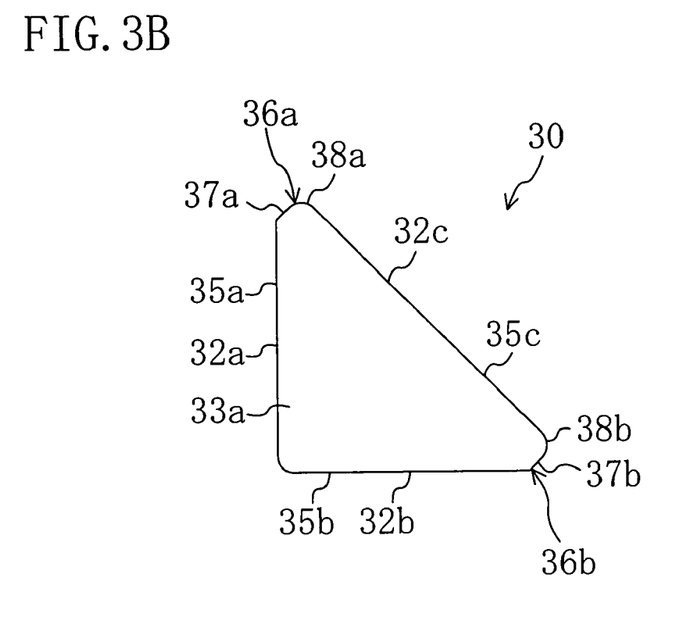

Specifically, as shown in FIG. 3, the prism body 31 is formed into a right triangular prism including orthogonal side faces which are intersected at a right angle with each other and an inclined side face which is inclined with respect to the orthogonal side faces. In the prism body 31, the orthogonal side faces serves as a light incident plane 32a and a light exit plane 32b, and the inclined side face serves as a light reflection plane 32c. The prism 30 is so formed that light made incident perpendicularly from the light incident plane 32a is reflected by the light reflection plane 32c and exits from the light exit plane 32b. In the imaging device 1, the prism 30 is so arranged that the light incident plane 32a is located on the first lens group 12 side while the light exit plane 32b is located on the second lens group 13 side.

In the prism body 31, respective ridges 36a, 36b formed between the light reflection plane 32c and the light incident plane 32a or the light exit plane 32b are formed into respective flat faces 37a, 37b. Accordingly, the flat faces 37a, 37b serve base planes in mounting the prism 30 to the housing member 23 to facilitate the positioning in mounting, thereby enabling provision of the prism 30 that can be mounted at an accurate position of the imaging device 1.

Figure 4A:
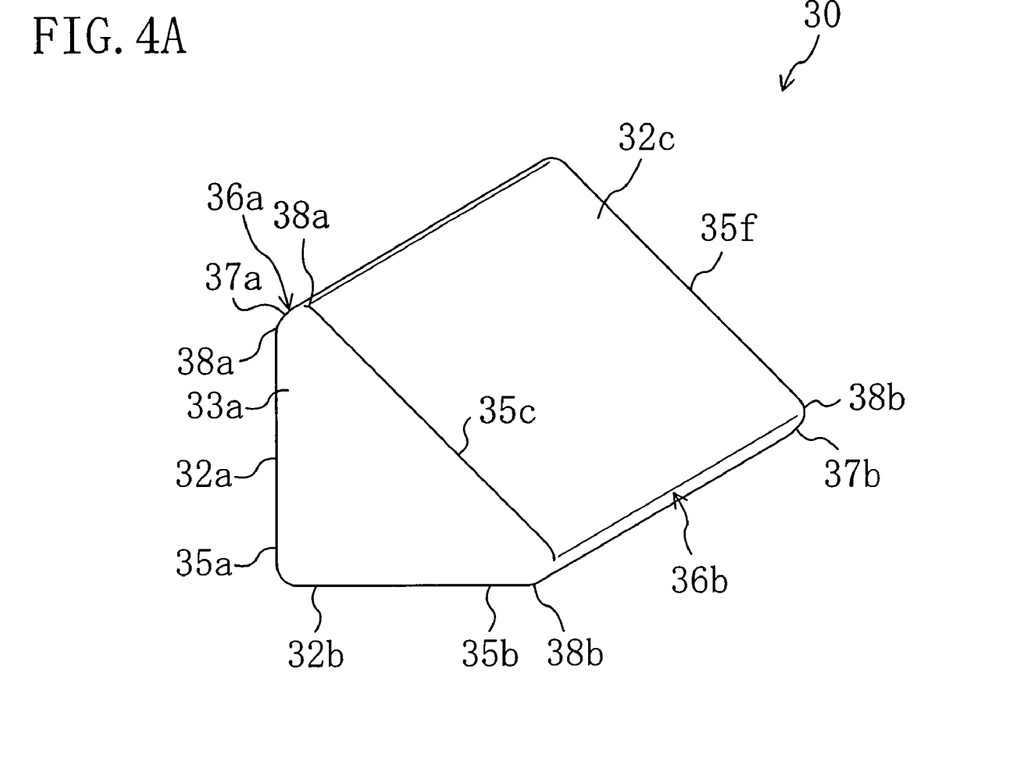
FIG. 4 is a perspective view of a prism according to Embodiment 1.
Figure 4B:
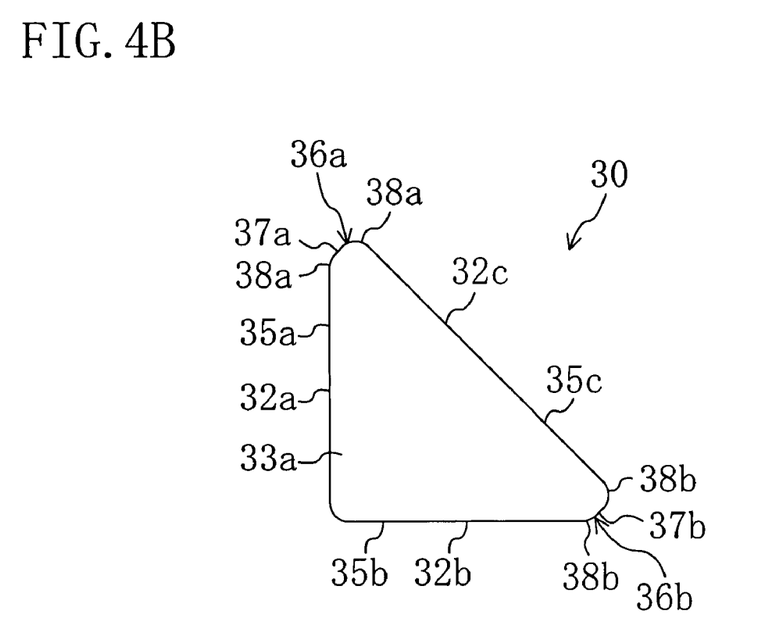

A joint part 38a between the flat face 37a and the light reflection plane 32c is formed into an R-plane, and a joint part 38b between the flat face 37b and the light reflection plane 32c are formed into an R-plane, as well. Further, as shown in FIG. 4, a joint part 38a between the flat face 37a and the light incident plane 32a is formed into an R-plane, and a joint part 38b between the flat face 37b and the light exit plane 32b is formed into an R-plane, as well. All of the ridges 35a to 35f respectively formed between the end faces 33a, 33b and the light incident plane 32a, the light exit plane 32b or the light reflection plane 32c are formed into R-planes. Accordingly, the joint parts 38a, 38b and the ridges 35a to 35f, all of which are formed into the R-planes, are prevented from being broken and chipped by external impact in conveyance, in mounting to optical equipment, and the like, with results that the yield of the prism 30 is prevented from lowering and a high-quality prism 30 can be provided.

The material of the prism 30 is not limited especially and may be plastic or glass including crystallized glass, for example. A glass material is especially preferable. When the prism 30 is made of glass, high accuracy of form, high thermal resistance, high mechanical durability, and high homogeneity can be achieved. In addition, since glass is comparatively small in thermal expansion coefficient and photoelastic constant, the prism 30 is hardly deformed even if the imaging device 1 is increased in temperature, causing less or no degradation of the optical characteristics of the prism 30.

Moreover, the refractive index of the glass-made prism 30 can be increased comparatively easily. The prism 30 having a high refractive index shortens the length of the optical path of an optical system (the lens groups 12 to 14, the prism 30, and the light receiving element 11) of the imaging device 1. Thus, the imaging device 10 can be compacted.

Increased refractive index of the prism 30 increases the light reflectance of the light reflection plane 32c. The light reflection plane 32c is preferable to having 90% or greater light reflectance with respect to visible light (light having a wavelength in the range between 300 nm and 700 nm, both inclusive) made incident perpendicularly to the prism body 31 from the light incident plane 32a. More preferably, the light reflectance thereof is 95% or greater. For achieving such a high reflectance, the refractive index with respect to the D line (light having a wavelength of 589 nm) of the prism 30 is preferably 1.6 or greater. More preferably, the refractive index thereof is 1.65 or greater. Preferably, the prism 30 has a high transmittance with respect to visible light.

For example, in the case where the prism 30 has a low refractive index (for example, where the prism 30 is made of grass having a low refractive index or plastic), a light reflection film (not shown) may be formed on the light reflection plane 32c. With the light reflection film formed, the reflectance of the light reflection plane 32c increases. This achieves high light utilization efficiency. The light reflection film may be made of gold, aluminum, or the like, for example.

Figure 5:
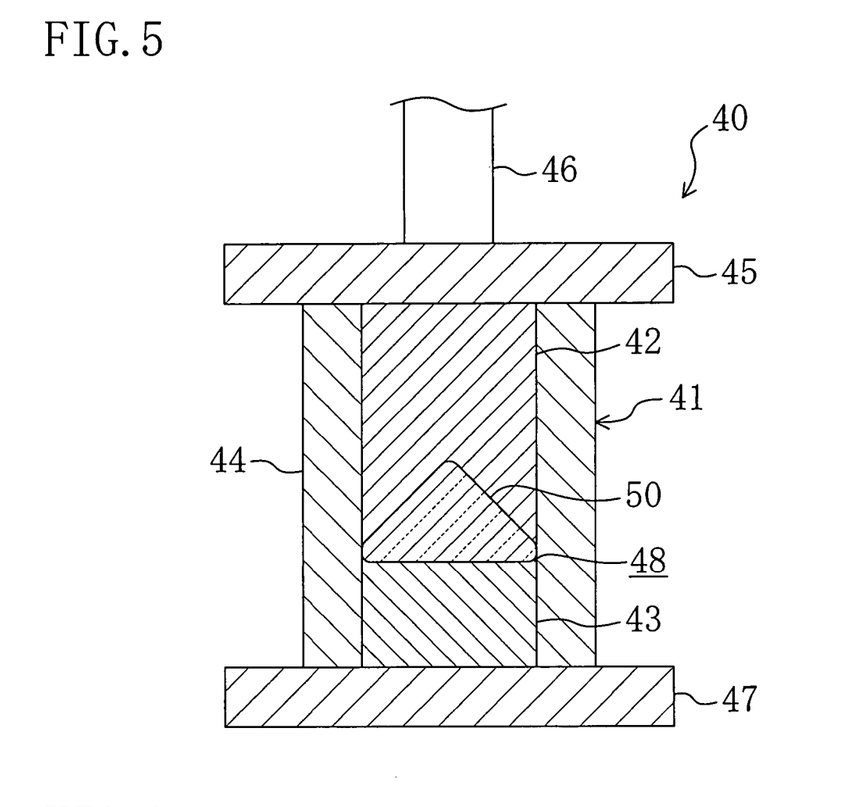
FIG. 5 is a sectional view showing a construction of a manufacturing apparatus for press-molding a prism.

FIG. 5 shows a partial sectional view of a manufacturing apparatus 40 of the prism 30. The manufacturing apparatus 40 includes molding dies 41 for press-molding the prism 30. The molding dies 41 include an upper die 42 for molding the orthogonal side faces of the prism body 31, a lower die 43 for molding the inclined side face, and an angular cylindrical mold body 44 to which the upper die 42 and the lower die 43 are inserted slidably. The molding faces of the dies, namely, faces forming an internal space 48 to which a prism base material 50 is inserted are processed into forms having a desired accuracy for molding the optical function planes of the prism 30. For providing high strength to the upper die 42, the lower die 43, and the mold body 44, they are preferably made of hard metal. Alternatively, stainless steel (for example, STAVAX, a product by Uddeholm KK) may be used as the material of the upper die 42, the lower die 43, and the mold body 44. Optionally, a protection film may be formed on the molding faces of the molding dies 41 for enhancing the mold release characteristic of the prism 30 and for suppressing oxidation and corrosion of the molding dies 41. For example, the molding faces may be subjected to electroless nickel plating.

A press head 45 changeable in temperature is mounted at the top of the upper die 42 for vertically moving the upper die 42. The press head 45 includes pressing means 46. A press stage 47 changeable in temperature is mounted at the bottom of the lower die 43.

Description will be given to a method for manufacturing the prism 30 with the use of the above manufacturing apparatus 40.

First, the prism base material 50 is inserted into the internal space 48 defined and formed by the upper die 42 and the lower die 43 in the mold body 44 of the molding dies 41. The prism base material 50 is made of glass (K-VC78, a product by Sumita Optical Glass, Inc. or the like), for example.

Subsequently, the upper die 42 and the lower die 43 are heated by the press head and the press stage 47. The heated upper die 42 and the heated lower die 43 heat the prism base material 50 to a predetermined temperature. For example, the prism base material 50 is heated up to around the deformation point thereof (around 570° C., for example).

Next, the cylinder 46 is driven to lower the press head 45 to press-mold the prism base material 50. Press molding is performed in such a manner that the relative positional relationship between the upper die 42 and the lower die 43 is changed to a range satisfying a condition that the volume of the prism base material 50 is smaller than the volume of the inner space 48 of the molding dies 41 at the time when the press molding is completed.

The heating is stopped with the relative positional relationship between the upper die 42 and the lower die 43 maintained. Then, the prism base material 50 is cooled to a temperature around Tg (glass transition point thereof) by the press head 45 and the press stage 47.

Finally, the cylinder 46 is driven to raise the press head 45, and the upper die 42 is taken out from the mold body 44 to open the molding dies 41. Then, the press-molded prism 30 is taken out.

The prism 30 manufactured by the above manufacturing method includes the ridges 36a, 36b respectively formed into the flat planes 37a, 37b between the light reflection face 32c and the light incident plane 32a or the light exit plane 32b. Further, the joint parts 38a, 38b between the respective flat faces 37a, 37b and the light reflection plane 32c are formed into the R-planes. Moreover, when the relative positional relationship between the upper die 42 and the lower die 43 is adjusted in the above press molding, the joint part 38a between the flat face 37a and the light incident plane 32a and the joint part 38b between the flat face 37b and the light exit plane 32b can be formed into the R-planes. Furthermore, all of the ridges 35a to 35f respectively formed between the end faces 33a, 33b and the light incident plane 32a, the light exit plane 32b, or the light reflection plane 32c are formed into the R-planes. Thus, each ridge 36 and each joint part 38 are formed into the R-planes simultaneously with formation of the optical function planes and the non-optical function plane, so that brakeage and chipping can be prevented without performing a post treatment, thereby preventing the yield of the prism 30 from lowering.

The light incident plane 32a and the light exit plane 32b are intersected at a right angle with each other in Embodiment 1, but may be intersected at any angle.

Further, though the prism 30 in Embodiment 1 is so formed that light made incident from the light incident plane 32a is reflected by the light reflection plane 32c and exits from the light exit plane 32b, the prism 30 may be formed and arranged in the housing member 23 so that light from the first lens group 12 is reflected by an external face as the light reflection plane 32c and exits on the second lens group 13 side. In other words, the prism 30 is used as a prism of external face reflection type.

Embodiment 2

While Embodiment 1 describes the imaging device 1 using the prism 30, the prism 30 may be used in any optical devices other than the imaging device 1. For example, it may be used in a lighting device. In Embodiment 2, a lighting device 2 including the prism 30 will be descried in detail with reference to FIG. 6. In the description of Embodiment 2, the same reference numerals are assigned to the same constitutional elements as those in FIG. 2 to FIG. 5 for omitting detailed description thereof.

Figure 6:
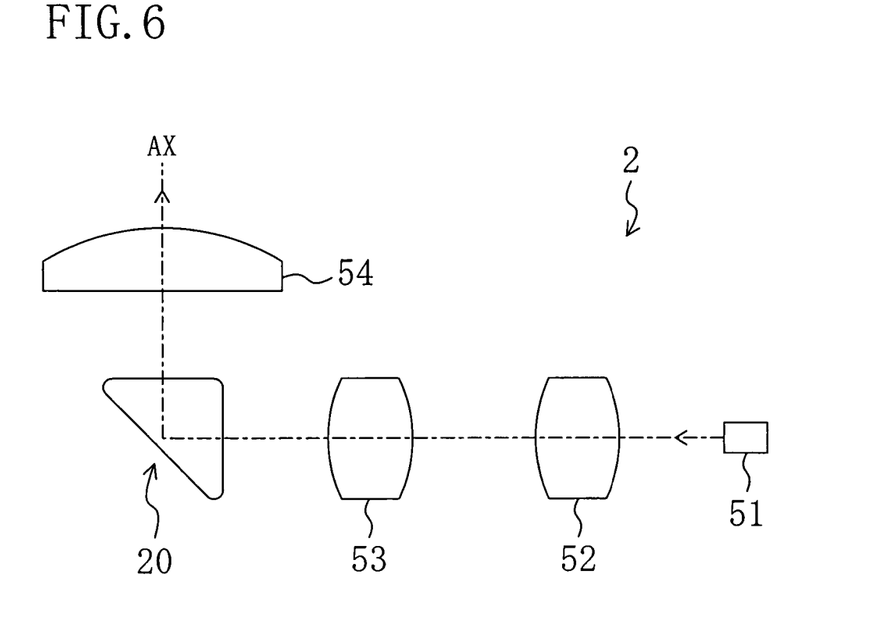
FIG. 6 is a diagram showing a configuration of a main part of a lighting device according to Embodiment 2 of the present invention.

FIG. 6 shows the lighting device 2 according to Embodiment 2 of the present invention. The lighting device 2 according to Embodiment 2 of the present invention includes a light source 51, lens groups (a first lens group 52, a second lens group 53, and a third lens group 54), and the optical element unit 20. In Embodiment 2, the prism 30 is so arranged that the light incident plane 32a of the prism body 31 is located on the light source 51 side while the light reflection plane 32c thereof is located on the first lens group 52 side.

The light source 51 is a light source that emits parallel light or diffused light. The light emitted from the light source 51 is transmitted through the first lens group 52 and the second lens group 53 and is made incident to the light incident plane 32a of the prism 30.

The light made incident to the prism 30 is reflected by the light reflection plane 32c and exits from the light exit plane 32b. The light exited from the prism 30 is transmitted through the third lens group 54 to be allowed to exit from the lighting device 2.

INDUSTRIAL UTILIZATION

As described above, the present invention is useful for a prism, an imaging device and a lighting device each including it, a prism manufacturing method, and the like.

The invention claimed is:

1. A prism, comprising:
a prism body formed into a polygonal column,
wherein at least one of a plurality of ridges of the prism body is formed into a flat face, and
a joint part between the flat face and at least one of faces of the prism body which are adjacent to each other with the ridge in the flat face interposed is formed into an R-plane.

2. The prism of claim 1,
wherein at least one of a plurality of ridges formed between side faces of the prism body in the polygonal column which are adjacent to each other is formed into a flat face, and
a joint part between the flat face and one of the side faces of polygonal column which are adjacent to each other with the ridge in the flat face interposed is formed into an R-plane.

3. The prism of claim 1,
wherein at least one of a plurality of ridges formed between side faces of the prism body in the polygonal column which are adjacent to each other is formed into a flat face, and
each joint part between the flat face and side faces of the polygonal column which are adjacent to each other with the ridge in the flat face interposed is formed into an R-plane.

4. The prism of claim 3,
wherein at least one of a plurality of ridges formed between the respective side faces and the respective end faces of the prism body in the polygonal column is formed into an R-plane.

5. In the prism of claim 1,
wherein the prism body is in a form of a right triangular prism including two orthogonal side faces which are intersected at a right angle with each other and an inclined side face which is inclined with respect to the two orthogonal side faces.

6. The prism of claim 5,
wherein two ridges formed between the inclined side face and the two orthogonal side faces are formed into flat faces,
joint parts formed between the flat faces and the orthogonal side faces and between the flat faces and the inclined side face are formed into R-planes, each orthogonal side face being adjacent to the inclined side face with the ridges in the flat faces interposed, and
all of a plurality of ridges formed between end faces and the two orthogonal side faces or the inclined side face are formed into R-planes.

7. The prism of claim 5,
wherein the inclined side face is provided with a reflection film.

8. The prism of claim 5,
wherein the prism body has a reflectance of 90% or greater at the inclined side face with respect to visible light made incident from one of the two orthogonal side faces perpendicularly to the one orthogonal side face.

9. The prism of claim 1,
wherein the prism body is made of glass.

10. The prism of claim 1
wherein the prism body has a refractive index of 1.65 or greater with respect to a D line thereof.

11. An imaging device comprising:
a light receiving element; and
a prism including a prism body formed into a polygonal column, at least one of a plurality of ridges of the prism body being formed into a flat face, and a joint part between the flat face and at least one of faces of the prism body which are adjacent to each other with the ridge in the flat face interposed being formed into an R-plane,
wherein the prism body is in a form of a right triangular prism including two orthogonal side faces which are intersected at a right angle with each other and an inclined side face which is inclined with respect to the two orthogonal side faces and is arranged so that incident light to the prism body is reflected by the inclined side face toward the light receiving element.

12. The imaging device of claim 11,
wherein the prism body is arranged so that the incident light is made incident from one of the two orthogonal side faces and exits from the other orthogonal side face.

13. A lighting device, comprising:
a light source; and
a prism including a prism body formed into a polygonal column, at least one of a plurality of ridges of the prism body being formed into a flat face, and a joint part between the flat face and at least one of faces of the prism body which are adjacent to each other with the ridge in the flat face interposed being formed into an R-plane,
wherein the prism body is in a form of a right triangular prism including two orthogonal side faces which are intersected at a right angle with each other and an inclined side face which is inclined with respect to the two orthogonal side faces and is arranged so that light from the light source is reflected by the inclined side face.

14. The lighting device of claim 13,
wherein the prism is arranged so that light from the light source is made incident from one of the two orthogonal side faces and exits from the other orthogonal side face.

15. A method for manufacturing a prism including a prism body in a form of a right triangular prism including two orthogonal side faces which are intersected at a right angle with each other and an inclined side face which is inclined with respect to the two orthogonal side faces, at least one of a plurality of ridges of the prism body being formed into a flat face and the prism body having a joint part formed into an R-plane between the flat face and at least one of faces of the prism body which are adjacent to each other with the ridge in the flat face interposed, comprising the step of:

press-molding while heating a prism base material to obtain the prism body.

16. The prism manufacturing method of claim 15,
wherein the press molding step is performed, with the use of an upper die for molding the two orthogonal side faces of the prism body, a lower die for molding the inclined side face thereof, and a mold body to which the upper die and the lower die are inserted slidably, in such a manner that the prism base material is inserted into an inner space defined and formed between the upper die and the lower die in the mold body and a relative positional relationship between the upper die and the lower die is changed to a range satisfying a condition that a volume of the prism base material is smaller than a volume of the inner space at a time when the press molding is completed.

* * * * *

UNITED STATES PATENT AND TRADEMARK OFFICE
CERTIFICATE OF CORRECTION

PATENT NO.       : 7,589,923 B2
APPLICATION NO.  : 11/792485
DATED            : September 15, 2009
INVENTOR(S)      : Toshiaki Takano et al.

It is certified that error appears in the above-identified patent and that said Letters Patent is hereby corrected as shown below:

On the title page,

In Item "(86) PCT No.:",
please delete "PCT/JP2006/022259", and add --PCT/JP2006/322259--.

In Item "(56) References Cited", under "FOREIGN PATENT DOCUMENTS",
please add the reference --JP 33-583 B1  02/1958--.

Signed and Sealed this
Twenty-first Day of June, 2011

David J. Kappos
*Director of the United States Patent and Trademark Office*